United States Patent
Matsubara

[11] Patent Number: 6,065,708
[45] Date of Patent: May 23, 2000

[54] CORD WINDER

[75] Inventor: Kazuo Matsubara, Tokyo, Japan

[73] Assignee: Midori Electronics Co., Ltd., Kawasaki, Japan

[21] Appl. No.: 09/188,243

[22] Filed: Nov. 9, 1998

[30] Foreign Application Priority Data

Aug. 7, 1998 [JP] Japan .................................. 10-223917

[51] Int. Cl.[7] .......................... B65H 75/38; B65H 23/04; B65H 75/14

[52] U.S. Cl. .................................... 242/388.1; 242/396.6; 242/422.4; 242/608.6; 242/612; 242/613.2

[58] Field of Search .............................. 242/378.1, 388.1, 242/396.6, 422.4, 422.9, 609.1, 608.6, 612, 613.2

[56] References Cited

U.S. PATENT DOCUMENTS

| | | | |
|---|---|---|---|
| 1,408,745 | 3/1922 | Keyworth | 242/613 |
| 3,756,534 | 9/1973 | Keiner et al. | 242/422.9 |
| 4,150,798 | 4/1979 | Aragon | 242/388.1 |
| 4,901,938 | 2/1990 | Cantley et al. | 242/378.1 |
| 5,779,175 | 7/1998 | Shirahase | 242/338.1 |
| 5,915,640 | 6/1999 | Wagter et al. | 242/388.1 |

FOREIGN PATENT DOCUMENTS 3-8692  3/1991  Japan .

*Primary Examiner*—John Q. Nguyen
*Attorney, Agent, or Firm*—Foley & Lardner

[57] ABSTRACT

A cord winder for winding a cord comprises a first structure having a bottomed cylindrical shape and a second structure rotatably held in the first structure. The second structure includes a circular base portion, a center cylindrical stud raised on a center of the circular base portion and radially extending ribs formed on an outer surface of the center cylindrical stud. The ribs are arranged to constitute a bobbin structure. The first and second structures are provided with a cord inserting groove through which the cord can be led to the bobbin structure when the first and second structures take mutually coincident positions. The cord is wound on the bobbin structure when relative rotation takes place between the first and second structures. A braking structure is employed for braking the relative rotation when an external force is applied to the first and second structures to induce the relative rotation. The braking structure includes a curved toothed structure connected to one of the first and second structures and a resilient projection possessed by the other of said first and second structures. The projection is resiliently engaged with the toothed member.

10 Claims, 5 Drawing Sheets

CORD WINDER

BACKGROUND OF THE INVENTION

1. Field of the Invention

The present invention relates in general to cord winders, and more particularly to the cord winders of a type which can adjust at need the length of the drawn-out part of the cord.

2. Description of the Prior Art

Hitherto, various types of cord winders have been proposed and put into practical use particularly in the field of household and office electric apparatuses, such as electric cleansers, electric toasters, personal computers and the like.

One of the conventional cord winders is described in Japanese Utility Model Second Provisional Publication 3-8692, which was proposed by the same applicant.

The cord winder of this publication generally comprises an upper shell, a lower shell, a hinge structure provided between the upper and lower shells and at least one take-up stud provided by the lower shell. However, this cord winder has failed to provide users with a full satisfaction because of its inherency originating from a difficulty in handling the same. That is, usually, the upper and lower shells are kept coupled to constitute a single unit. Upon need of winding a cord, the upper and lower shells are uncoupled, and a middle portion of the cord is wound on the take-up stud by a required length, then end portions of the cord are drawn out from the lower shell and then the two shells are coupled again. In fact, to carry out these steps, a troublesome and time-consumed manual work is needed by the users.

SUMMARY OF THE INVENTION

It is therefore an object of the present invention to provide a cord winder which can wind or take up a cord with easy manual work.

According to the present invention, there is provided a cord winder for winding a cord, which comprises a first structure having a bottomed cylindrical shape; a second structure rotatably held in the first structure, the second structure including a circular base portion, a center cylindrical stud raised on a center of the circular base portion and radially extending ribs formed on an outer surface of the center cylindrical stud, the ribs being arranged to constitute a bobbin structure; first means for providing the first and second structures with a cord inserting groove through which the cord can be led to the bobbin structure when the first and second structures take mutually coincide positions, the cord being wound on the bobbin structure when relative rotation takes place between the first and second structures; and second means for braking the relative rotation when an external force is applied to the first and second structures to induce the relative rotation, the second means including a curved toothed structure connected to one of the first and second structures and a projection resiliently possessed by the other of the first and second structures, the projection being resiliently engaged with the toothed member.

DETAILED DESCRIPTION OF THE EMBODIMENTS

In the following, embodiments of the present invention will be described in detail with reference to the accompanying drawings.

In the description, directional terms, such as "upper", "lower", "right", "left", "upward", "downward", etc., are to be understood with respect to the drawings in which the objective parts are illustrated.

Figure 1:
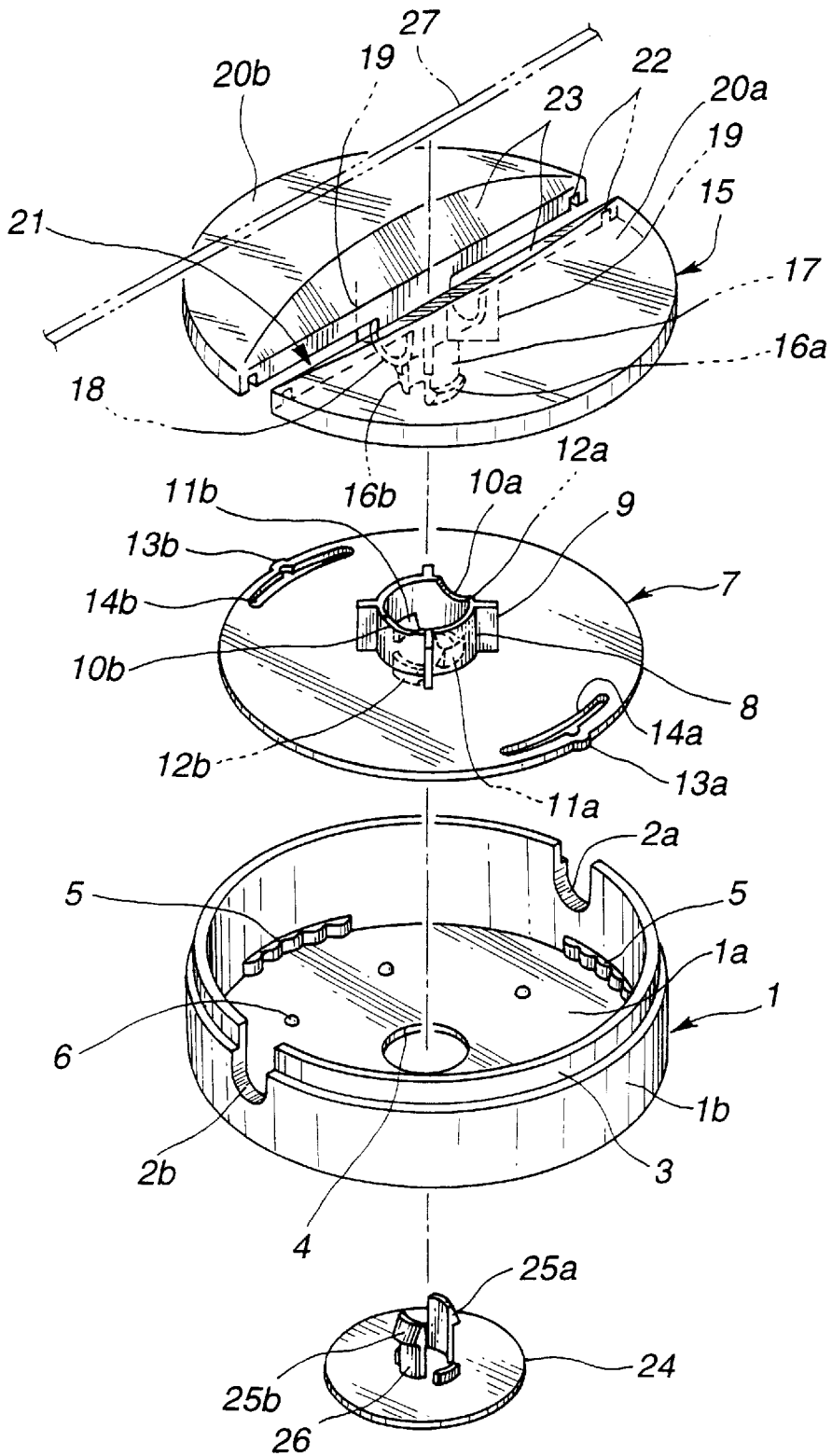
FIG. 1 is an exploded view of a cord winder which is a first embodiment of the present invention.

Referring to FIGS. 1 to 7, particularly FIG. 1, there is shown a cord winder 100 which is a first embodiment of the present invention.

As is shown in FIG. 1, the cord winder 100 comprises a circular shell 1 including a circular bottom 1a and an annular wall 1b. The annular wall 1b is formed at diametrically opposed portions with rounded cuts 2a and 2b which terminate at a top edge of the annular wall 1b. As shown, a stepped portion 3 is defined around the annular wall 1b near the top edge of the same. A plurality (viz., four in the illustrated embodiment) of check members 5 are provided on the deepest portion of the annular wall 1b at equally spaced intervals. Each check member 5 comprises a plurality of rounded portions lying one after another, as shown. The circular bottom 1a is formed with a circular center opening 4. The circular bottom 1a is further formed around the center opening 4 with a plurality of small semi-spherical projections 6 which are arranged at equally spaced intervals.

Within the circular shell 1, there is rotatably disposed a winding disc 7. The winding disc 7 is formed at a center portion thereof with a tubular stud 8 which extends upward. The height of the tubular stud 8 is smaller than that of the annular wall 1b of the circular shell 1. The tubular stud 8 is formed thereabout with a plurality of equally spaced radial ribs 9. In the illustrated embodiment, four ribs 9 are provided. The top of the tubular stud 8 is formed at diametrically opposed portions with rounded recesses 10a and 10b.

Figure 5:
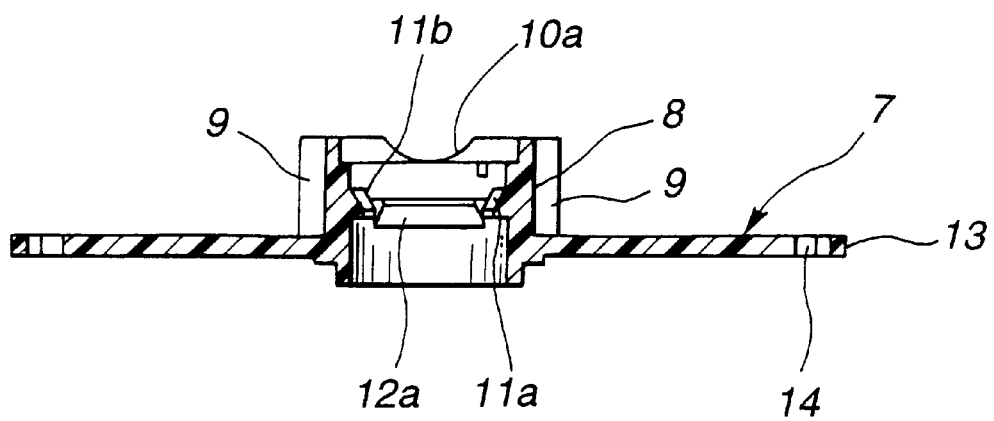
FIG. 5 is a sectional view of a winding disc used in the cord winder of the first embodiment.
Figure 6:
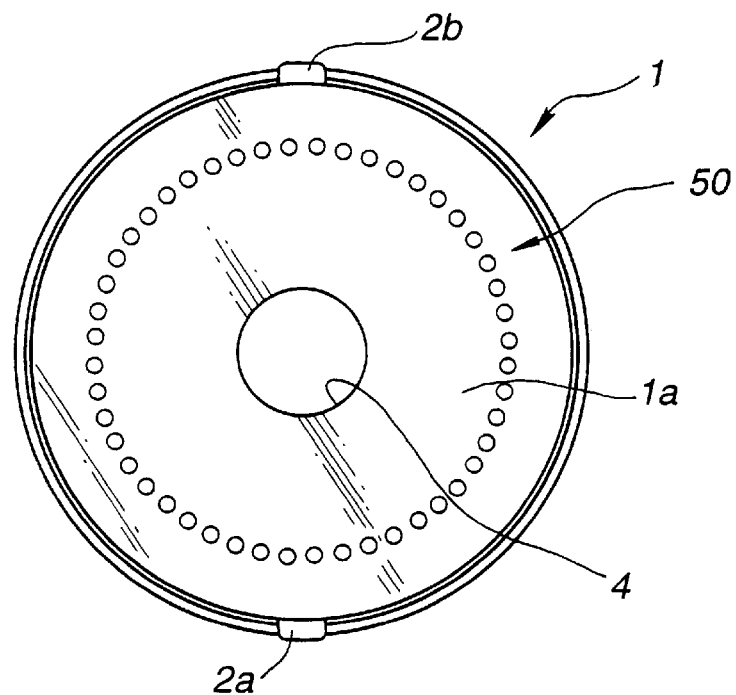
FIG. 6 is a plan view of a modified shell which is usable in the cord winder of the first embodiment.
Figure 7:
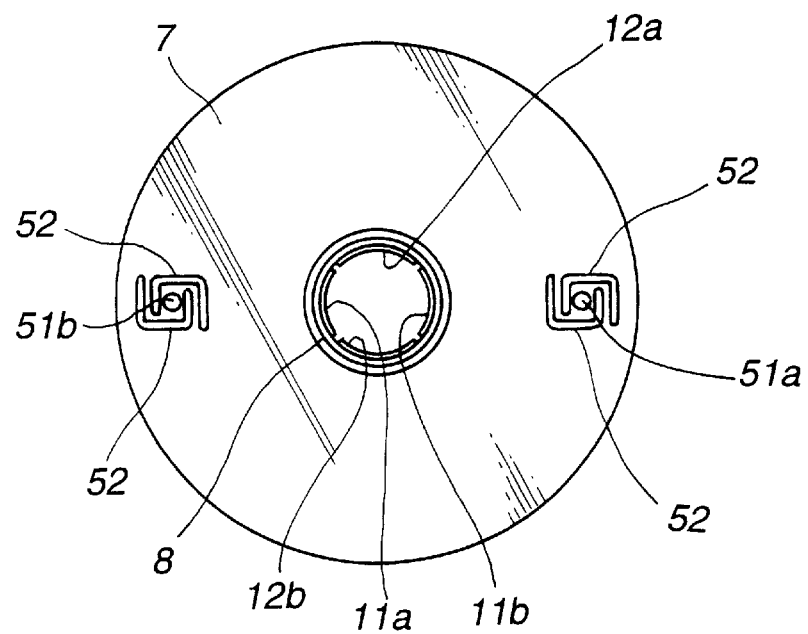
FIG. 7 is a back view of a modified winding disc which is usable in the cord winder of the first embodiment.

As is well seen from FIGS. 5 and 7, the tubular stud 8 is formed on its inner cylindrical wall with a pair of upper hooks 11a and 11b and a pair of lower hooks 12a and 12b, each pair being arranged to face each other. As is seen from FIG. 5, the upper hooks 11a and 11b have each an upward facing tapered surface and the lower hooks 12a and 12b have each a downward facing tapered surface.

Referring back to FIG. 1, the winding disc 7 is formed at diametrically opposed peripheral ends thereof with rounded projections 13a and 13b and near the projections 13a and 13b with respective arcuate slots 14a and 14b. Due to provision of the arcuate slots 14a and 14b, the projections 13a and 13b can store a suitable reaction force when inwardly pressed. As will become apparent as the description proceeds, under rotation of the winding disc 7 in the circular shell 1, the two rounded projections 13a and 13b are resiliently abut against the check members 5 to produce a certain resistance against the rotation of the winding disc 7.

A circular winding cap 15 is detachably fixed to the winding disc 7 to rotate therewith and a holding cap 24 is detachably fixed to the winding disc 7 from the outside of the circular shell 1 for rotatably holding the winding disc 7 in the circular shell 1.

That is, for the connection of the winding cap 15 to the winding disc 7, a center cylindrical stud 17 of the winding cap 15 is detachably engaged with an upper part of the tubular stud 8 of the winding disc 7, and for the connection of the holding cap 24 to the winding disc 7, a center cylindrical stud 26 of the holding cap 24 is detachably engaged with a lower part of the tubular stud 8 of the winding disc 7.

As shown in FIG. 1, the circular winding cap 15 generally comprises two semicircular parts 20a and 20b and a connecting s part 18 by which the two semicircular parts 20a and 20b are connected. The semicircular parts 20a and 20b are spaced from each other to define therebetween a cord inserting groove 21. As is best seen from FIG. 4, the two semicircular parts 20a and 20b have at their mutually facing end portions with inclined surfaces 23 which are sloped toward the cord inserting groove 21. With the provision of the inclined surfaces 23, insertion of a cord 27 into the cord inserting groove 21 is easily carried out as will be described hereinafter.

As shown in FIG. 1, the connecting part 18 is formed on a lower side of the winding cap 15 and has a generally U-shaped construction not to project into the cord inserting groove 21.

The circular winding cap 15 is formed at its peripheral portion with an annular groove 22 which slidably receives therein the top edge of the annular wall 1b of the circular shell 1. The above-mentioned center cylindrical stud 17 is integral with the connecting part 18 of the winding cap 15.

Figure 4:
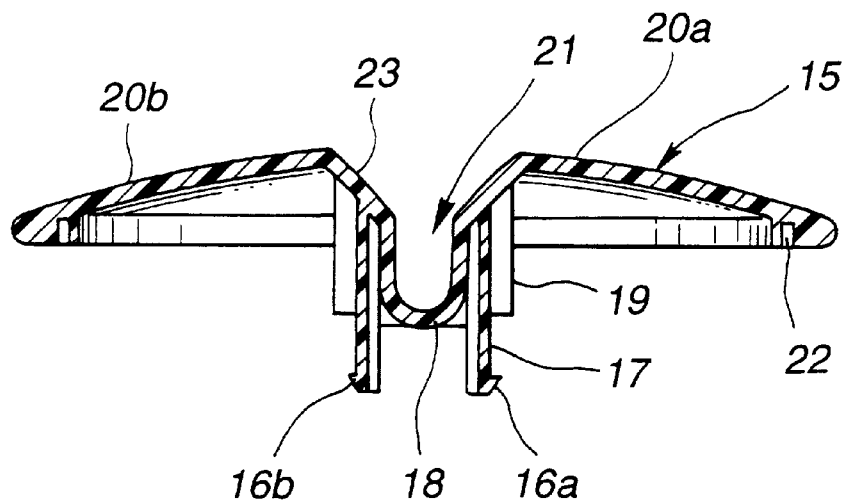
FIG. 4 is a sectional view of a winding cap used in the cord winder of the first embodiment.

As is seen from FIGS. 1 and 4, the center cylindrical stud 17 comprises two stud parts each having a hook 16a or 16b. Upon coupling between the winding cap 15 and the winding disc 7, the hooks 16a and 16b are engaged with the upper hooks 11a and 11b to achieve latching therebetween. As is best seen from FIG. 4, the connecting part 18 is formed thereabout with a plurality of equally spaced radial ribs 19. In the illustrated embodiment, four ribs 19 are provided. Each rib 19 has a flat end which extends in parallel with an axis of the winding disc 7.

As is seen from FIGS. 4 and 5, upon coupling between the winding cap 15 and the winding disc 7, the radial ribs 19 become aligned with the radial ribs 9 of the winding disc 7 to constitute a so-called bobbin structure and the generally U-shaped connecting part 18 becomes put on the rounded recesses 10a and 10b of the tubular stud 8 of the winding disc 7.

As is seen from FIG. 1, the center cylindrical stud 26 of the holding cap 24 comprises two stud parts each having a hook 25a or 25b. Upon coupling between the holding cap 24 and the winding disc 7, the hooks 25a and 25b are engaged with the lower hooks 12a and 12b to achieve latching therebetween. A circular base part of the holding cap 24 is sized to sufficiently cover the center opening 4 of the circular shell 1.

In the following, steps for assembling the cord winder 100 will be described with reference to FIG. 1.

First, for coupling the winding cap 15 and the winding disc 7, the cylindrical center stud 17 of the winding cap 15 is strongly thrust into the tubular stud 8 of the winding disc 7. Upon this, the hooks 16a and 16b of the center stud 17 become engaged with the upper hooks 11a and 11b of the tubular stud 8 thereby to achieve a latched engagement between the winding cap 15 and the winding disc 7. As has been mentioned hereinabove, in this condition, the radial ribs 19 of the winding cap 15 are aligned with the radial ribs 9 of the winding disc 7 to constitute a so-called bobbin structure.

Then, the coupled unit (viz., the unit including the winding cap 15 and the winding disc 7) is put into the circular shell 1 having the annular groove 22 of the winding cap 15 received on the top edge of the annular wall 1b of the circular shell 1. With this, the winding disc 7 is placed in the deepest position of the circular shell 1 and the winding cap 15 is placed on the top edge of the circular shell 1.

Then, the center cylindrical stud 26 of the holding cap 24 is thrust into the tubular stud 8 of winding disc 7 from the outside of the circular shell 1. Upon this, the hooks 25a and 25b of the stud 26 become engaged with the lower hooks 12a and 12b of the tubular stud 8 thereby to achieve a latched engagement between the holding cap 24 and the winding disc 7, so that the holding cap 24, the winding disc 7 and the winding cap 15 constitute a single unit that is rotatable relative to the circular shell 1. In this assembled condition, the rounded projections 13a and 13b of the winding disc 7 are resiliently engageable with the check members 5 upon rotation of the single unit.

In the following, steps for winding a cord 27 by using the cord winder 100 will be described with reference to FIGS. 2 and 3.

Figure 2:
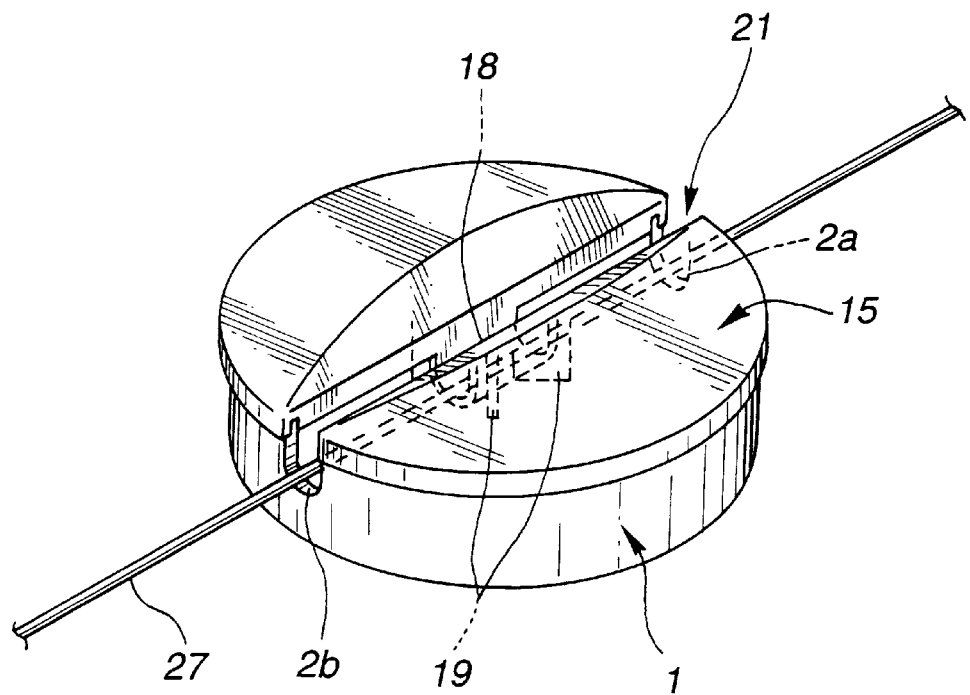
FIG. 2 is a perspective view of the cord winder of the first embodiment in an assembled condition.
Figure 3:
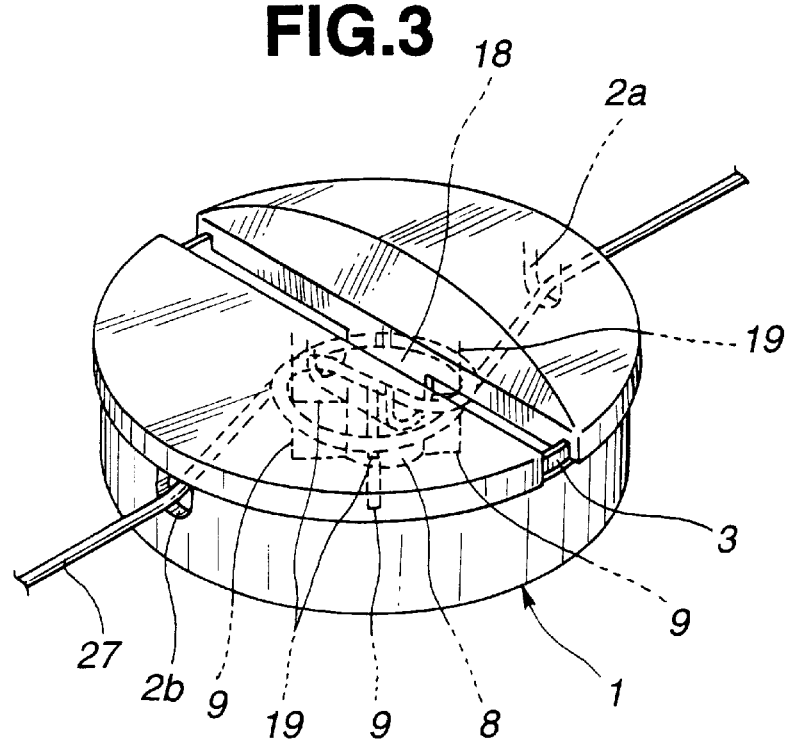
FIG. 3 is a view similar to FIG. 2, but showing a condition wherein a cord is being wound by the cord winder.

First, as is seen from FIG. 2, the winding, cap 15 is turned relative to the circular shell 1 to take a coincident position wherein the cord inserting groove 21 of the winding cap 15 is coincided with the two rounded cuts 2a and 2b of the circular shell 1.

Then, as is seen from FIG. 2, the cord 27 (more specifically, a middle part of the cord 27) is inserted or put into the cord inserting groove 21 having opposed portions thereof drawn to the outside from the rounded cuts 2a and 2b. Due to provision of the sloped surfaces 23, the insertion of the cord 27 into the groove 21 is easily carried out.

Then, with the circular shell 1 kept held by the operator's hand, the winding cap 15 is turned by desired times about a center axis thereof. Under this turning, the annular groove 22 of the winding cap 15 travels on and along the top edge of the annular wall 1b of the circular shell 1. With this, as is seen from FIG. 3, the bobbin structure consisting of the above-mentioned aligned ribs 19 and 9 winds thereon the cord 27 drawing the opposed portions of the cord 27 into the circular shell 1. During this rotation, the rounded projections 13a and 13b (see FIG. 1) are forced to slide on the check members 5 providing the operator with a detent feeling. It is to be noted that the small semi-spherical projections 6 formed on the bottom 1a of the circular shell 1 promote a smoothed rotation of the winding disc 7 in the circular shell 1.

When now the external force for turning the winding cap 15 is removed, the rotation of the winding disc 7 stops and the winding disc 7 keeps its finally set angular position against a counterforce produced by the cord 27 wound on the bobbin structure. This is because of the resilient engagement between the rounded projections 13a and 13b and the check members 5. Thus, the cord 27 can be shortened to a desired length by the cord winder 100.

When now drawing of the cord 27 from the cord winder 100 is required for increasing the length of the cord 27, the two opposed portions of the cord 27 are pulled by a certain force in opposite directions. With this, relative rotation between the unit (viz., the unit consisting of the winding cap 15, the winding disc 7 and the holding cap 24) and the circular shell 1 is carried out permitting drawing of the cord 27 from the cord winder 100.

When the pulling force is removed, the relative rotation stops permitting the winding disc 7 to keep its new angular position relative to the circular shell 1. Thus, the cord 27 can be elongated to a desired length by the cord winder 100. While, if the two opposed portions of the cord 27 are further pulled in the opposite directions, the cord winder 100 is finally turned back to the coincide position of FIG. 2 and thus the cord 27 can be removed from the cord winder 100.

In the following, modifications employable in the above-mentioned first embodiment 100 will be described.

If desired, the check members 5 (see FIG. 1) may be arranged throughout the entire of the deepest portion of the annular wall 1b.

Furthermore, in place of using the check members 5 and the resilient rounded projections 13a and 13b, the following measure may be employed. That is, in this measure, as is seen from FIG. 6, the circular bottom 1a of the circular shell 1 is formed with a plurality of small semi-spherical projections 50 which are circularly arranged to surround the center opening 4, and as is seen from FIG. 7, the lower surface of the winding disc 7 is formed at diametrically opposed portions with two semi-spherical projections 51a and 51b which are slidably engageable with the projections 50. Each projection 51a or 51b has a suitable resiliency due to provision of slits 52 formed in the winding disc 7. In the illustrated example, the slit 52 has a generally U-shape. Of course, the slits 52 may be removed if much stronger resiliency is needed by the projections 5a and 51b.

Figure 8:
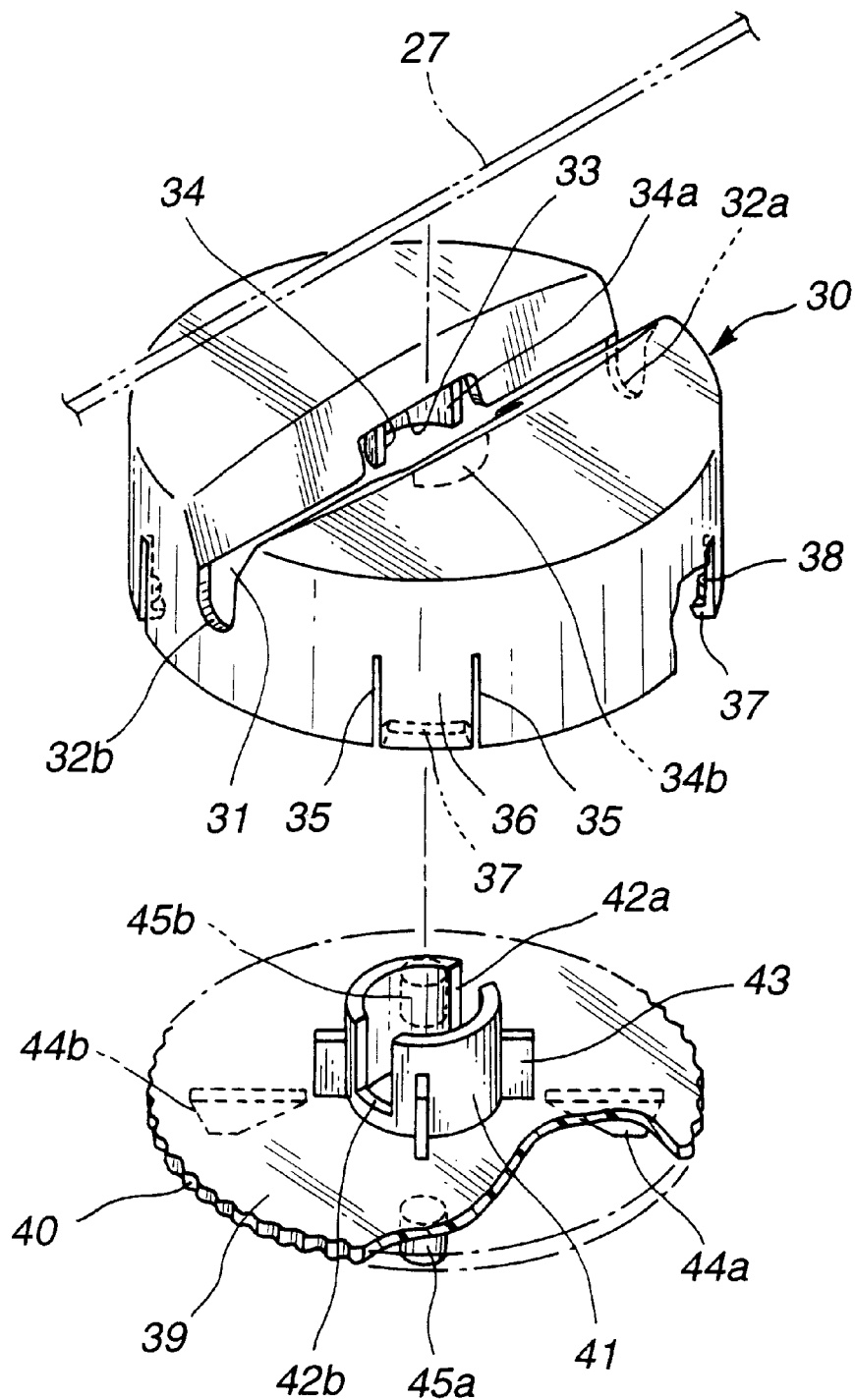
FIG. 8 is an exploded view of a cord winder which is a second embodiment of the present invention.

Referring to FIG. 8, there is shown a cord winder 200 which is a second embodiment of the present invention.

As will be become apparent as the description proceeds, the cord windier 200 of the second embodiment employs a reduced number of parts as compared with the cord winder 100 of the first embodiment.

That is, the cord winder 200 comprises generally two parts, which are a cylindrical winding cap 30 and a winding disc 39 which are rotatably coupled with each other.

The cylindrical winding cap 30 is formed with a center cylindrical stud 34 which extends downward from a center portion of a circular base portion of the winding cap 30. The center cylindrical stud 34 comprises two stud parts 34a and 34b. The winding cap 30 is further formed in the circular base portion with a cord inserting groove 31 which extends diametrically.

As shown, an annular wall portion of the winding cap 30 is formed at diametrically opposed portions with rounded cuts 32a and 32b which constitute terminal ends of the cord inserting groove 31. Opposed end portions of the circular base portion between which the cord inserting groove 31 is defined are sloped toward the groove 31. The sloped end portions are formed at respective middle portions with rectangular recesses 33 through which inner cylindrical surfaces of the center cylindrical stud 34 are exposed to the cord inserting groove 31.

The annular wall portion of the winding cap 30 is formed at a lower portion thereof with a plurality of resilient lugs 36 each being defined between opposed slits 35 formed in the annular wall portion. Due to provision of the slits 35, the lugs 36 can store a suitable reaction force when applied with an external force. Preferably, the resilient lugs 36 are arranged at equally spaced intervals. Each resilient lug 36 has at its leading end a hook 37 facing inward and at its middle portion a rounded projection 38 facing inward.

The winding disc 39 is formed with a toothed periphery 40 which includes a circularly arranged teeth. As will be clarified hereinafter, when the winding disc 39 is coupled with the winding cap 30, the toothed periphery 40 are in contact with the rounded projections 38 of the resilient lugs 36 of the winding cap 30. A center cylindrical stud 41 extends upward from a center portion of the winding disc 39. The center cylindrical stud 41 is so sized as to rotatably receive the center cylindrical stud 34 of the above-mentioned winding cap 30. The stud 41 is formed there-around with four equally spaced ribs 43 and at diametrically opposed portions thereof with slots 42a and 42b, as shown. If desired, more than four ribs 43 may be provided. Each rib 43 has a flat end which extends in parallel with an axis of the winding disc 39. The ribs 43 constitute a so-called bobbin structure when the cord winder 200 is assembled. As shown, on a lower surface of the winding disc 39, there are provided a pair of projections 45a and 45b and a pair of wings 44a and 44b which serve as a thumb handle.

For assembling the cord winder 200, the center cylindrical stud 34 of the winding cap 30 is strongly thrust into the center cylinder stud 41 of the winding disc 39. Upon this, the hooks 37 of the resilient lugs 36 of the winding cap 30 ride over the toothed periphery 40 of the winding disc 39 causing the winding disc 39 to take a work position wherein the toothed periphery 40 operatively engages with the rounded projections 38 of the resilient lugs 36 of the winding cap 30. That is, in this assembled condition, the winding cap 30 and the winding disc 39 can make a relative rotation therebetween having the rounded projections 38 of the cap 30 pressed against the toothed periphery 40 of the disc 39.

In the following, steps for winding a cord 27 by using the cord winder 200 will be described with reference to FIG. 8.

First, as is seen from the drawing, the winding cap 30 is turned relative to the winding disc 39 to take a coincide position wherein the cord inserting groove 31 is coincided with the two slots 42a and 42b of the winding disc 39.

Then, the cord 27 (more specifically, a middle part of the cord 27) is thrust or put into the cord inserting groove 31 having opposed portions thereof drawn to the outside from the rounded cuts 32a and 32b of the cap 30.

Then, with the winding cap 30 kept held by the operator's hand, the winding disc 39 is turned by desired times about a center axis thereof. For this turning, the projections 45a and 45b and the wings 44a and 44b are manipulated. During the turning of the winding disc 39, the bobbin structure consisting of the ribs 43 winds thereon the cord 27 drawing the opposed portions of the cord 27 into the winding cap 30. During this, the rounded projections 38 of the cap 30 are forced to slide on the toothed periphery 40 of the disc 39 providing the operator with a comfortable detent feeling.

When now the operator stops turning the winding disc 39, the winding disc 39 keeps its finally set angular position against a counterforce produced by the cord 27 wound on the bobbin structure. This is because of the resilient engagement between the rounded projections 38 and the toothed periphery 40.

Since steps for increasing the length of the cord 27 and turning the cord winder 200 to the coincide position are substantially the same as those taken by the above-mentioned cord winder 100, description of them will be omitted.

It is to be understood that, although the invention has been described with specific reference to particular embodiments thereof, it is not to be so limited since changes and alternations therein may be easily made within the full intended scope of this invention as defined by the appended claims.

What is claimed is:

1. A cord winder for winding a cord, comprising:

a bottomed cylindrical shell having a center opening in a circular bottom thereof and two cuts at diametrically opposed portions of an annular wall thereof;

a winding disc rotatably disposed in said cylindrical shell, said winding disc being formed with a center tubular stud;

a winding cap having a first center cylindrical stud, said first center cylindrical stud being detachably thrust into said center tubular stud of said winding disc to provide a unit consisting of said winding cap and said winding disc, said winding cap being formed with a diametrically extending cord inserting groove whose middle portion penetrates into a base part of said first center cylindrical stud; and a holding cap having a second center cylindrical stud which is detachably connected to said center tubular stud of said winding disc from the outside of said bottomed cylindrical shell and is structured to rotatably hold said unit in said shell, wherein said cord inserting groove aligns with said two cuts when said unit takes a given angular position relative to said bottomed cylindrical shell.

2. A cord winder as claimed in claim 1, in which mutually facing portions of said winding cap between which said cord inserting groove is defined are sloped toward said cord inserting groove.

3. A cord winder as claimed in claim 1, further comprising a braking structure which brakes the rotation of said unit relative to said bottomed cylindrical shell.

4. A cord winder as claimed in claim 3, in which said braking structure comprises:

a plurality of check members circumferentially arranged on an inner cylindrical wall of said shell; and two projections formed on diametrically opposed peripheral ends of said winding disc, each projection being slidably and resiliently engageable with said check members during rotation of said unit in said shell.

5. A cord winder as claimed in claim 4, in which said winding disc is formed with slots near said projections of said winding disc to provide said projections with a resiliency.

6. A cord winder as claimed in claim 3, in which said braking structure comprises:

a plurality of projections circumferentially arranged on the circular bottom of said bottomed cylindrical shell to surround said center opening; and two projections resiliently formed on a lower surface of said winding disc, said projections being slidably engageable with the projections of said circular bottom.

7. A cord winder as claimed in claim 1, in which said center tubular stud is formed with a first group of radial ribs and said first center cylindrical stud is formed with a second group of radial ribs, said first and second groups of radial ribs becoming aligned to constitute a bobbin structure upon coupling between said winding disc and said winding cap.

8. A cord winder as claimed in claim 1, further comprising:

a first latching structure which effects a latched engagement between said center tubular stud and said first center cylindrical stud when these studs are deeply engaged with each other; and a second latching structure which effects a latched engagement between said center tubular stud and said second center cylindrical stud when these studs are deeply engaged with each other.

9. A cord winder as claimed in claim 1, in which said winding cap is formed with an annular groove which slidably receives therein a top edge of the annular wall of said bottomed cylindrical shell.

10. A cord winder as claimed in claim 1, in which the circular bottom of said bottomed cylindrical shell is formed with a plurality of rounded projections which bear said winding disc.

* * * * *